(12) United States Patent  
Njemanze

(10) Patent No.: US 6,490,573 B1  
(45) Date of Patent: Dec. 3, 2002

(54) NEURAL NETWORK FOR MODELING ECOLOGICAL AND BIOLOGICAL SYSTEMS

(76) Inventor: Philip Chidi Njemanze, No 1 Uratta Road, P.O. Box 302, Owerri IMO (NG)

( * ) Notice: Subject to any disclaimer, the term of this patent is extended or adjusted under 35 U.S.C. 154(b) by 0 days.

(21) Appl. No.: 09/547,426

(22) Filed: Apr. 11, 2000

(51) Int. Cl.$^7$ .............................................. G06F 9/445
(52) U.S. Cl. ......................................... 706/19; 706/45
(58) Field of Search ............................. 706/19, 12, 13, 706/22

(56) References Cited

U.S. PATENT DOCUMENTS

| | | | | |
|---|---|---|---|---|
| 4,881,178 A | * | 11/1989 | Holland et al. | 706/12 |
| 5,140,530 A | * | 8/1992 | Guha et al. | 706/13 |
| 5,706,402 A | * | 1/1998 | Bell | 706/22 |
| 5,777,888 A | * | 7/1998 | Rine et al. | 702/19 |
| 5,961,831 A | * | 10/1999 | Lee et al. | 210/614 |

OTHER PUBLICATIONS

Spatial decision support system for land assessment Cláudio Chauke Nehme, Margareth Simões, Proceedings of the 7th international symposium on Advances in geographic information systems Nov. 1999, ACM, pp.: 85–90.*

Introduction & Overview of "Artificial life"—Evolving Intellect Agents for Modeling & Simulation, A. Martin Wildberger; Electric Power Research Institute, Proceedings of the 1996 Winter Simulation Conference, ACM.*

The use of artificial neural network (ANN) for modeling of the H202/UV decoloration process: Part I, Yness March Stokar; Jure Zupan; Alenka Majen Le Marechal; Dyes and Pigments 42 (1999) pp.: 125–135, 1999 Elsevier Science Ltd.*

* cited by examiner

Primary Examiner—Thomas Black  
Assistant Examiner—Michael B. Holmes

(57) ABSTRACT

A method of operating a neural network for ecological and biological system modeling having a plurality of hidden layer neurons said method comprising: a plurality of network inputs and at least one network output, said plurality of neurons, each receiving a plurality of inputs applied to the network, reproduces the network using a regression model, and compares the output values with given target values, and using the comparison and goodness of fit to set the learning rules. The network does not require repetitive training and yields a global minimum for each given set of input variables.

20 Claims, 3 Drawing Sheets

| Inputs | First Layer | Weights | Output |
|---|---|---|---|
| E1- Temperature | 1. Algae | Chlorophyll | Dissolved Oxygen |
| E2-Current Velocity | 2. Bacteria | Ammonia Nitrogen | Nitrate Nitrogen |
| E3-Light | 3. Vegetation | $CO_2$ assimilation/ Photosystem II efficiency | Substrate: Leaf area x Number per sq meter |
| E4-Biological Nitrogen Fixation (BNF) | 4. Geohydrology | Conductivity/Salinity | pH |
| E5- Carbon-dioxide | 5. Coarse woody debris | Asymbiotic nitrogenase activity | Detritus: Number per cubic mm |
| E6- Sound/Vibration | | | |

| | Second Layer | Weights | Output |
|---|---|---|---|
| | 6-Larval Density of S. damnosum | Number of Larvae per sq meter | Number of adult S. damnosum per unit area |
| | 7- Predator - Trichoptera | Number of Larvae of Trichoptera per sq meter | |
| | Third Layer | Weights | Output |
| | 8-Vector-parasite complex | Number infected of hosts (with parasites) | Infected adult blackflies per unit area |

*FIG. 3*

NEURAL NETWORK FOR MODELING ECOLOGICAL AND BIOLOGICAL SYSTEMS

CROSS-REFERENCE TO RELATED APPLICATION

U.S. Pat. No. 5,781,701 Jul. 14, 1998 Wang, et al . . . 395/24

OTHER REFERENCES

Hoffmann N. 1994. Simulating Neural Networks. Wiesbaden. Vieweg Statistica™, 1994. Volume II, pages 627–669. Tulsa, Okla., StatSoft™. ISBN 1-884233-18-X.

Crosskey R W, 1990. The natural history of blackflies. New York. John Wiley & Sons. ISBN 0-471-92755-4.

Yameogo L, Toe L, Hougard J M, Boatin B A, Unnasch T R. 1999. Pool screen polymerase chain reaction for estimating the prevalence of Onchocerca volvulus infection in Simulium damnosum sensu lato: results of a field trial in an area subject to successful vector control. Am J Trop Med Hyg, 60(1) 124–128.

Holling C S. The strategy of building models of complex ecological systems. In: Systems analysis in ecology. Watt K E F, (Ed.) Academic Press N.Y. Pp. 195–214. S Kershaw K A, Harris G P. Simulation studies and ecology: A simple defined system model. Statistical Ecology 3: 1–21. Penn. State Univ. Press, 1969.

Internet website.: http://www.lardav.com/ldlabs/2900b.html.

Internet website.: http://www.wmo.ch/web/gcos/terre/variable/biompk/html.

Internet website.: http://www.ucd.ie/~spectral/Chloroinfo.htm.

Internet website.: http://www.aquatest.com/nitro.html.

Internet website.: http://www.orionres.com/labcat/multipar/1230.html.

Internet website.: http://omnibus.uni-freiburg.de/~brunnera/nfixe.htm.

BACKGROUND OF THE INVENTION

Several approaches have been adopted in simulation of ecological and biological systems. Usually the initial approach to simulation of an ecosystem is to develop a simple linear model. That is to assume that if $Y1=f(x1)$ and $Y2=f(x2)$ then $(Y1+Y2)=f(x1+x2)$ or, that no second interaction between the two variables controlling a process. Often this is not true, and linear model may only give an approximation (reasonable or otherwise) to the real system. Inherent in biological systems are non-linearities. Simulation models may be stochastic or deterministic. This simply denotes whether a model contains some random events or not. Deterministic models contain a sequence of events, which follow with complete certainty to produce a result not affected by chance events. Conversely, if one or more of the sequence pathways are selected on a probability basis, the model is stochastic or probabilistic. The mathematical approach to a computer model defines a number of system variables, which characterize and control the 'flow' between component segments of the model. The flow or interaction between component segments of the model is derived from transfer functions. The model driving equations (forcing functions) involve those external parameters required as input to the model but which are little affected by the model if at all.

Two basic strategies are used for modeling. Compartment models, which are usually simple linear systems of differential equations very often describing biomass changes or energy flow in a system. Their purpose is to analyze the performance of the model rather than necessarily to attempt to model the real system. The second and more detailed strategy that has been employed is the component approach of Holling (1969) (detailed in an article titled "The strategy of building models of complex ecological systems" in a book titled "Systems analysis in ecology" by Watt K E F, (ed.) published by Academic Press N.Y. pages 195–214); or the building block by Kershaw and Harris (1969) (detailed in an article titled "Simulation studies and ecology: A simple defined system model" in Statistical Ecology volume 3: pages 1–21, published by Penn. State Univ. Press). This follows a stepwise fashion, from an experimental examination of each block or component, in turn, to a series of equations relating the parameters involved in each component, and back to the experimental-testing of the model at each step.

High biocomplexity, high natural dynamics, and certain periodic processes such as habitat fragmentation characterize ecological and biological systems. While empirical/statistical models describe the global behavior of ecological and biological systems and models of differential equations try to represent single processes, there is another type of knowledge that handles processes and behavior patterns in a causal manner. This knowledge cannot be formalized in generic predicate logic or similar paradigms without losses. Therefore a new approach is required that will match the changing dynamics of ecosystems with high adaptability and built-in feed back. The processing engine of the foregoing may be implemented through artificial neural networks comprising a plurality of logic elements called neural circuits. A neuron is the fundamental building block of an artificial neural network. The computer model represents these neurons as well as the whole network by data structures. The data are structured in layers. Each layer or data set represents one or more neurons. The neurons are connected with each other and with the surroundings. The neuron has multiple inputs and a single output.

There are many types of neural network architectures. Such neural architectures as "back propagation", "perceptron" and "Hopfield network" are the best known. Other neural network structures have been discussed extensively in a book titled "Simulating Neural; Networks" published in 1994 by Verlag Vieweg and authored by Norbert Hoffmann. The structure comprises of three or more layers, neurons connected to the input set and form a layer of input neurons, others transfer their output to the output set, and are called output neurons. The remaining neurons are not connected to the surroundings, and are called the hidden neurons. Each neuron in the hidden layer multiplies its inputs, as received from the input nodes, by a given weight to produce a product.

Most neural network structures have serious drawbacks. Which include time-consuming training of the networks for relatively complex problems such as that for ecological and biological systems simulation.

Another, disadvantage is that when weights converge, they usually converge to local minima, which gives erroneous solution. For example, a particular function may become slightly larger, regardless of how a particular parameter is moved. However, if the parameter were to be moved into a completely different place, the loss function may actually become smaller.

One can think of such local minima as local "valley" or minor "dents" in the loss function. However, in most practical applications, local minima will produce "outrageous" and extremely large or small parameter estimates with very large standard errors. In such cases different start values have to be specified and tried again.

To avoid local minima, statistical methods such as Boltzman training or Cauchy training has been applied. However, the optimum solution is the "best fit" global minimum" for a given set of examples. The U.S. Pat. No. 5,781,701 to Wang 1998, establishes a method that uses a neural network which utilizes a plurality of neuron circuits which do not individually utilize any non-linear function or summing circuit and which each require only a multiplier circuit as its main processing element.

In summary, the present approach of simulating ecological and biological systems using conventional methods do not match the high biocomplexity, high natural dynamics, and periodicity that characterize such systems. Conventional neural network approach needs to be modified to fit the inherent natural biological and physiological processes between elements of the ecosystem model. In addition, the complex circuitry of conventional neural networks severely limits their implementation in the form of computer software, and hence its application in ecological system modeling.

What is therefore required is a straight-forward neural architecture that is easy to implement in form of a software which yields a global minimum to each given set of input vectors and does not require repetitive training.

BRIEF SUMMARY OF INVENTION

A preferred embodiment of a neural network designed in accordance with the teachings of the present invention comprising input neurons and three layers of neurons by way of example. Input neurons serves an interconnect function, connecting external inputs to the network. A first layer of hidden neurons comprising neurons not connected to the surroundings. The second layer of hidden neurons receives inputs from the first. A third layer of neurons transfer their output values to the output set. They are called the output neurons.

In contrast to conventional artificial neural networks, a neural network constructed for ecological system scenarios in accordance with the present invention converges on a global solution using standard statistical regression model estimation, which can often be computed in a few minutes on a personal computer.

Moreover, in contrast to conventional approaches, there is provided in accordance to the teachings of the present invention a neural network which utilizes a plurality of neurons. The first layer of hidden neurons use non-linear estimation to predict the neuron weights from driving independent variables. The weights have established biological relationship with the neuron output.

Thus it will be appreciated that a neural network constructed in accordance with the present invention performs with accuracy, in less computational time and reduced cost and complexity of implementation, whether in a computer program or hardware design.

In addition, a neural network for ecological systems constructed in accordance with the present invention can have single or multiple outputs by providing multiple summing circuit for summing the outputs of the neurons.

Thus it is an advantage of the present invention to provide a neural network for ecosystems which utilizes a plurality of neurons, so that a neural network may be built comprising a very large number of such neurons processing inputs from a plurality of driving variables, resulting in a model which can simulate the high complexity and high temporal dynamics inherent in ecological and biological systems.

It is also an advantage of the present invention to provide a neural network for ecosystem modeling, which does not require repetitive training.

Yet another advantage of the present invention is to provide a neural network for ecosystem modeling which yields a global minimum to each given set of input variables.

It is also another advantage of the present invention to provide a method of modeling ecological and biological systems using a neural network in accordance with the present invention.

According to one aspect of the invention, there is provided a neural network for ecosystem modeling having a plurality of network inputs and at least one network output, the neural network comprising: a plurality of neurons, each neuron having a plurality of inputs and generating an output.

According to another aspect of the present invention, there is provided a method for training neural network comprising a plurality of neurons, which method requires estimation of loss function (to find the best fitting set of parameters) and to estimate the standard errors of parameter estimates via using algorithms (e.g quasi-Newton, Simplex, Hooke-Jeeves pattern moves, and Rosenbrock pattern search) to solve the values of each neuron weight and and hence output value.

According to yet another aspect of this invention there is provided a neural network for ecosystem modeling comprising: a plurality of network and at least one output; a plurality of neurons, each neuron receiving a plurality of inputs and generating an output; a method of operating the neural network, the method comprising the following steps: an initial iterative procedure comparing driving input variables (independent variables) to the weights (dependent variable), at each step, the program evaluates whether the fit of the model to data has improved from the previous step, i.e., how much "error" was lost between the previous and the current iteration, and calculating the loss function to determine how the goodness of the model fit to the data.

According to yet another aspect of the invention there is provided in a neural network for ecosystem modeling comprising: a plurality of network inputs and at least one network output; a plurality of neurons, each neuron receiving a plurality of inputs applied to the network, reproduces the network using a current model, and compares the output values with given target values and "hierarchially relates" (means that the current model is identical to the previous model with the exception of an addition or deletion of one or more driving or independent variables) to the previous model and using the comparison between the goodness of fit for the two models or difference to set the learning rules.

BRIEF DESCRIPTION OF THE DRAWINGS

The invention is pointed out with particularity in the appending claims. However, other features of the invention will become apparent and the invention will be best referring to the following detailed description in conjunction with the accompanying drawings in which:

FIG. 3 shows in a tabular format how the neural network in FIG. 1 may be applied to a specific ecological and biological system example, in accordance with the present invention.

DETAILED DESCRIPTION OF THE INVENTION

It will be understood by one skilled in the art that the neural network of the present invention may be implemented in hardware, software, or a combination thereof.

Figure 1:
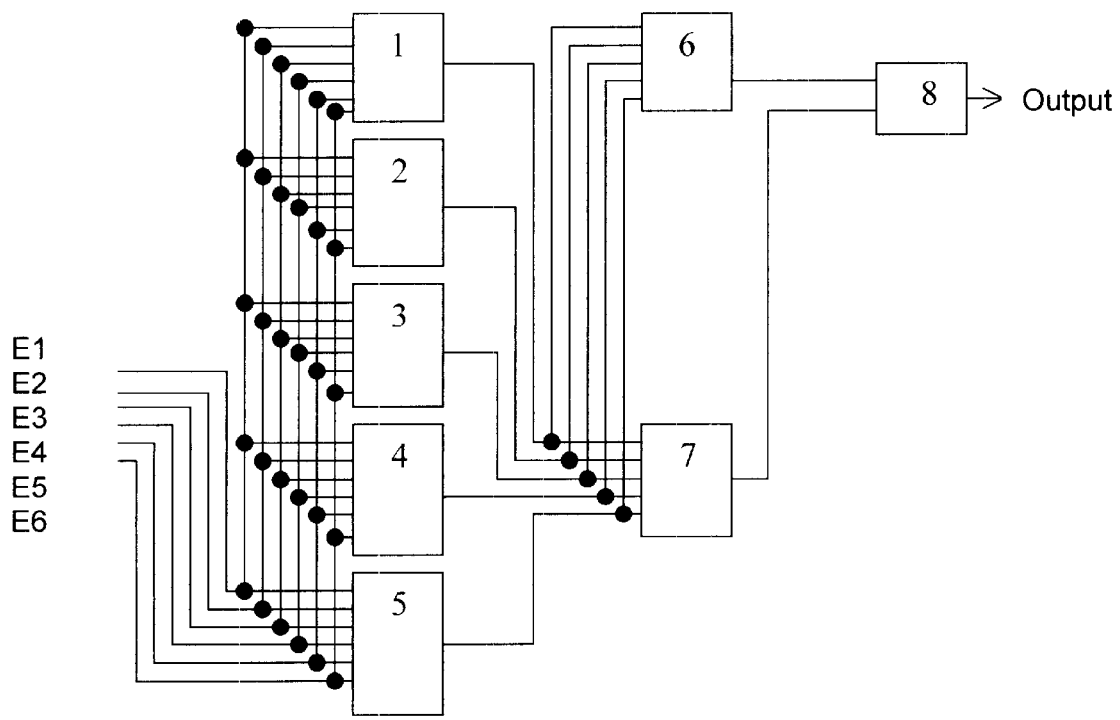
FIG. 1 shows conceptual diagram of a neural network, in accordance to the preferred embodiment of the present invention.

FIG. 1 shows a conceptual diagram of neural network structure in accordance with the present invention. A plurality of network inputs neuron E1, E2 . . . , E6 are connected to the input set and form a layer of input neurons. The neuron 8 transfer its value to the output set and is called the output layer neuron. The remaining neurons, namely the group 1,2 . . . ,5 and the group 6,7 form two layers not connected to the surrounding, and they are called the hidden layer neurons. Each neuron applies a user-specified regression model to define first, what types of relationships "makes sense," that is, are interpretable in a meaningful manner? This will determine the choice of a particular driving or independent input variable in the model.

The hidden neurons may apply a Simplex procedure to reduce the likelihood of local minima. This algorithm does not rely on the computation or estimation of the derivatives of the loss function. Instead at each iteration the function will be evaluated at m+1 points in the m dimensional parameter space. For example, in two dimensions (i.e., when there are two parameters to be estimated), the program will evaluate the function at three points around the current optimum. These three points would define a triangle; in more than two dimensions, the "figure" produced by these points is called a Simplex. An additional strength of this method is that when a minimum appears to have been found, the Simplex will again be expanded to a larger size to see whether the respective minimum is a local minimum. Thus, in a way, the input neuron using the Simplex moves like a smooth single cell organism down the loss function, contracting and expanding as local minima or significant ridges are encountered. The second layer of hidden neurons 6 and 7 will use the output of the first layer of hidden neurons 1,2 . . . ,5 to perform a user-specified regression. If a nonlinear relationship is suspected, the program proceeds to compute the specified regression for example, logarithmic function, exponential function, a function of some complex ratio of independent measures, etc. The choice of the nonlinear estimation model may begin with a Simplex procedure and proceeds with quasiNewton method and if necessary Hooke-Jeeves pattern moves, and finally Rosenbrock pattern search if other methods fail to produce a reasonable estimate. The computation yields the matrix of second-order (partial) derivatives also called the Hessian matrix (and asymptotic standard errors for the parameters). When the model is grossly misspecified, or the estimation procedure gets "hung up" in a local minimum, the standard errors for the parameter estimates (computed from the Hessian matrix when quasi-Newton estimation is chosen) can become very large. This means that regardless of how the parameters were moved around the final values, the resulting loss function did not change much. There may be very large correlation between parameters, indicating that parameters are very redundant; rephrased in another way, when the estimation algorithm moved one parameter away from final value, then the increase in the loss function could be almost entirely compensated by moving another parameter. In other words, the effect of those two parameters on the loss function was very redundant. The details of the statistical relevance of these and other parameters the reader is referred to a manual titled Statistica™ published in 1994, by StatSoft™ (Tulsa, Okla.), volume II, chapter 12, pages 627–669. A statistical software package such as Statistica™ can be used for such calculations obtained from StatSoft™ (Tulsa, Okla.). In like fashion, neuron 8 produces an output, which can be compared to target and so the appropriateness of the specified regression model can be evaluated.

Figure 2:
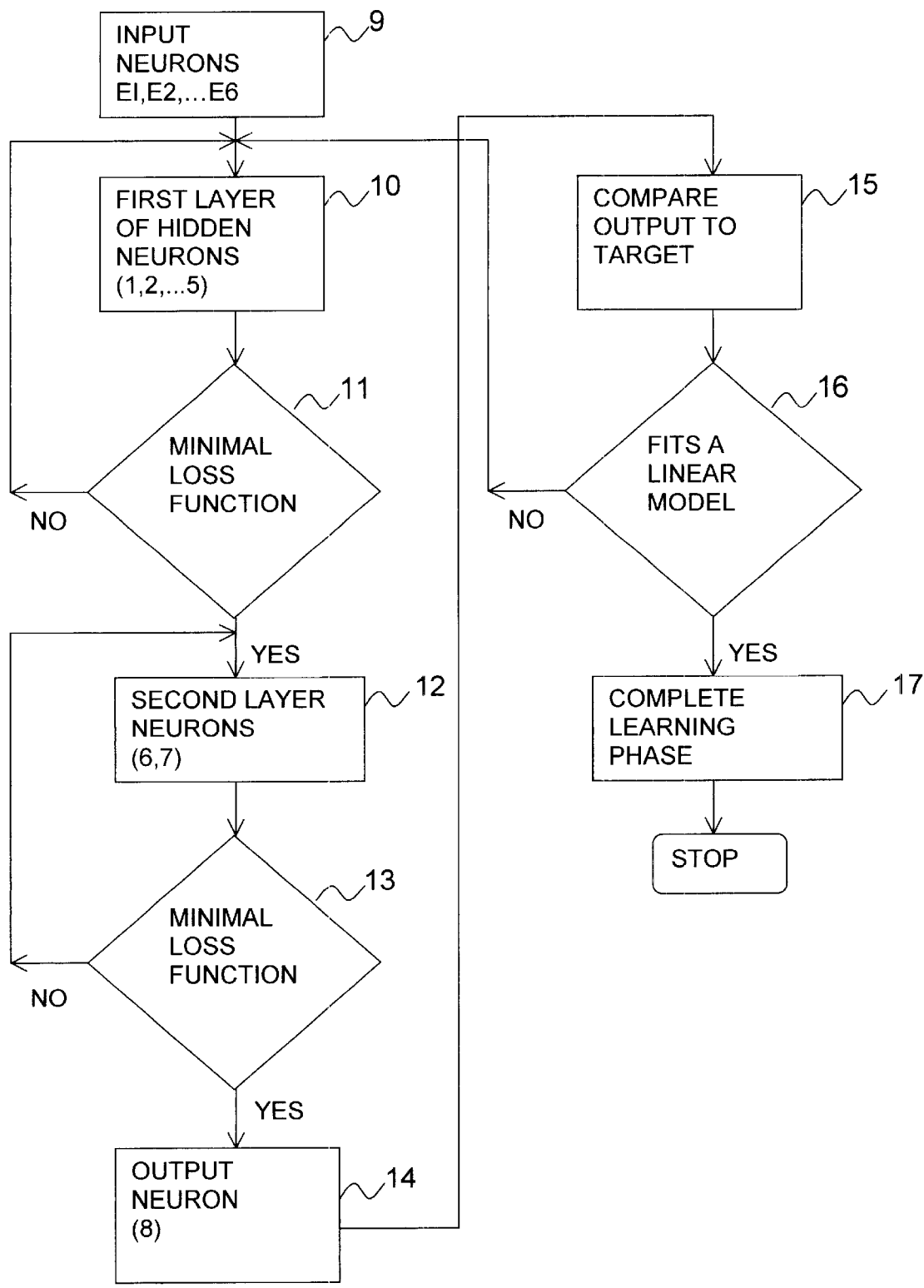
FIG. 2 shows a flow diagram of a method of using the neural network illustrated in FIG. 1.

FIG. 2 shows a flow diagram of a method of using the neural network illustrated in FIG. 1. As illustrated in box 9, each of the network input E1,E2 . . . , E6, are distributed to the inputs of each first layer of hidden neurons shown in box 10 (i.e neurons 1,2 . . . ,5 of the hidden layer in FIG. 1).

Next, as illustrated in box 10, each first hidden neurons (1, 2 . . . ,5) applies a user-specified regression model and nonlinear estimation method to determine the relationship between input variables and the weights of each neuron. If the loss function is minimal (the best fitting set of parameters are found) shown in box 11, then proceed to the next step in box 12, if not, change function minimization algorithm and repeat computation in box 10. The outputs from box 10 are fed to the second layer of hidden neurons (6, 7) as shown in box 12, where a new user-specified regression model and nonlinear estimation method is computed to determine the relationship between the input and the individual neuron weights. If the loss function is minimal (the best fitting set of parameters are found) as shown in box 13, then proceed to the next step in box 14, if not, change function minimization algorithm and repeat computation in box 12. The output of box 12 is now fed to the neuron 8 of the output layer illustrated in box 14, where similar user specified computation of regression model is performed. The efficiency of the neural network structure is examined by computation of the relationship between total output values with given (target) values as shown in box 15. An inspection of the scatterplot of the observed vs. predicted values confirms the appropriateness of the models for the data used. One would basically expect all points to fall on a straight line; if the models were misspecified, then this plot will indicate a non-linear pattern. The later will as shown in box 16 mean that, one must modify the weights and the estimation procedures from the onset as shown in box 10. If however, there is a linear relationship then the neural network learning phase is complete as shown in box 17.

FIG. 3 shows the application of the concept to ecological system modeling of a vector-borne disease—Onchocerciasis. The vector of this disease the blackfly (*S.damnosum*) breeds in a peculiar physical tropical environment in rivers with high current flow. Other factors like temperature light, gaseous content have been shown to affect the number of blackfly. The details about the ecology of this vector have been published in a book titled "The natural history of blackflies" by Crosskey R W, 1990, published by John Wiley & Sons. New York. ISBN 0-471-92755-4. The input neurons E1,E2, . . . E6, may be represent driving variables in the model such as temperature, river flow velocity, $CO_2$, biological nitrogen fixation (BNF), light, sound and vibration. Temperature can be measured using a thermometer. The river flow velocity can be measured using water meter (paddle wheel device). The sound and vibration can be measured Larson Davis model 2900B Real-time Analyzer using the Data, Navigation and Analysis—DNA software (http://www.lardav.com/ldlabs/2900b.html). The equipment is manufactured by Larson Davis, of PCB Piezotronics Inc, Depew, N.Y., USA.

The neurons of the first layer include bacteria, zooplankton, phytoplankton and physical environment:

algae, bacteria, vegetation, geohydrology and woody debris from deforestation. To estimate biological nitrogen fixation (BNF) it will require knowledge of leaf area index and species composition. Species composition will be obtained through remote sensing in combination with limited ground sampling. See (http://www.wmo.ch/web/gcos/terre/variable/biompk/html). The weights are real numbers belonging to the neuron. Thus they are parts of its data structure. Note from the example that the weights are chosen such that they are directly or inversely proportional the output. Analogously weights can be considered to be flow chlorophyll from green algae. The chlorophyll from green algae can be measured photometrically using in-vivo photometric chlorophyll as a measurement technique for determining the chlorophyll content of suspensions of algae in water. It is a measurement of the red pigment of chlorophyll directly in the water sample (see http://www.ucd.ie/~spectral/Chloroinfo.htm). This equipment can be obtained from Spectral Signatures Ltd. Roebuck, Belfield, Dublin Ireland. The nitrifying bacteria provide the conversion from ammonia nitrogen to nitrite nitrogen (NO2). In order to determine organic and ammonia nitrogen, the test commonly used is Total Kjeldahl (pronounced "kel-doll") Nitrogen (TKN) (see http://www.aguatest.com/nitro.html). TKN measures both ammonia nitrogen and organic nitrogen, it is sometimes necessary to also measure the ammonia nitrogen using a different test. This will determine what fraction of the TKN is associated with organic nitrogen. Another neuron is the geohydrology with rocky and mineral contents that provide varying levels of salinity and conductivity which can be measured using Orion Model 1230 portable multi-parameter meter (Orion Research, Beverly, Mass.) (http://www.orionres.com/labcat/multipar/1230.html). The last neuron in this layer is the coarse woody debris from deforestation, which constitutes the substrate for nitrogen fixing bacteria. The estimation of the asymbiotic nitrogenase activity in coarse woody debris can be measured with the acetylene reduction assay under ambient conditions (see http://omnibus.uni-freiburg.de/~brunnera/nfixe.htm).

Similarly the output of the neurons 1,2 . . . 5 will be measured using the above mentioned techniques. Both dissolved oxygen and pH can be measured using the Orion Model 1230 portable multi-parameter meter. The leaf surface area and the number per square meter can be measured by direct measurement. The detritus, which comprises the food for the larvae of the vector S. damnosum, can be counted under a microscope in a cubic mm chamber. The second layer neurons comprise the larval density of S. damnosum and the predators of the larvae Trichoptera. The various weights of both neurons comprise the number of larvae respectively. The output is the number of adult S. damnosum per unit area. The output layer neuron comprise the vector-parasite complex. The parasite Onchocerca volvulus infect the blackflies through contact with diseased livestock or human host. The number of infected blackflies can be determined using standard polymerase chain reaction (PCR) technique using such instrumentation as the GeneAmp®5700 Sequence Detection System (Perkin Elmer Biosystems Corporation, Foster City Calif.) as has been described by Yameogo et al in an article titled "Pool screen polymerase chain reaction for estimating the prevalence of Onchocerca volvulus infection in Simulium damnosum sensu lato: results of a field trial in an area subject to successful vector control" published in American Journal Tropical Medicine and Hygiene, 1999; volume 60(1), pages 124–128. The total output of the neural structure can be measured by the number of adult blackflies infected with O. volvulus.

Ecological systems are characterized by high biocomplexity, high natural dynamics, coincidences and certain periodic processes. The state of the neural network is changing steadily in time, a network simulated by a computer can alter its state only at discrete times t=0,1,2,3, . . . The time t=0 denotes the starting state of the network. Given the state at the time t, the state at t+1 may be calculated.

The simulation program reproduces the network layer by layer beginning with the first layer. The reproduction of a layer consists of two steps: Step (a): Using the input and activation functions (specified regression model and nonlinear estimation), each neuron computes its activity from the values on its inputs. The output values remain unchanged. Thus the resulting calculation is independent of the order in which the neurons are selected even if the network has feedback.

Step (b): Each neuron computes its output value from its activity, in this case the order also plays no role. These two steps may be executed several times. This makes sense if the layer has feedback. The network is in its new state when all the layers have been reproduced.

The network has both reproduction phase when all the weights must be already known, and the learning phase when one applies input values to the network, reproduces the network, and compares the output values with given target values (i.e. the values which the outputs should have). According to the result of this comparison, one modifies the weights using cleverly devised learning rules.

Other variation or modifications to the subject matter of this invention, in light of what has been disclosed herein, may occur to those skilled in the art upon review of the subject matter of this invention. Such variations or modifications, if within the spirit of this invention, are intended to be encompassed within the scope of any claims to patent protection issuing upon this development. The description of the preferred embodiment set forth herein is done so for illustrative purposes only.

What I claim as my invention is:

1. A method of operating a neural network for modeling ecological and biological systems having a plurality of hidden layer neurons, said method comprising the following steps:

(a) distributing network inputs to said hidden layer neurons as driving independent variables;

(b) said hidden layer neurons performing a user-specified regression model using the neuron weights as the dependent variable;

(c) said regression model at each step evaluates whether the fit of the model to the data has improved from the previous step, and calculating the loss function;

(d) said loss function is estimated using least squares estimation procedure aimed at minimizing the sum of squared deviations of the observed values for the independent variable from those predicted by the model stated as:

$$\text{Loss}=(\text{Pred}-\text{Obs})^{**}2$$

wherein Pred and Obs indicate predicted and observed values respectively;

(e) said loss function can also be estimated using weighted least squares stated as:

$$\text{Loss}=(\text{Obs}-\text{Pred})^2*(1/x^2);$$

(f) said loss function using a user-specified minimization algorithm;

(g) said minimization algorithm using a Simplex procedure such that when a minimum appears to have been found, the Simplex will again be expanded to a larger size to see whether the respective minimum is a local minimum;

(h) said loss function minimization algorithm using a quasi-Newton method;

(i) said quasi-Newton method at each step of the iteration will evaluate the function at different points to estimate the first-order derivatives and second-order derivatives;

(j) said minimization algorithm using the Hooke-Jeeves pattern moves;

(k) said Hooke-Jeeves pattern moves at each iteration first defines a pattern of points by moving each parameter one by one, so as to optimize the current loss function;

(l) said Hooke-Jeeves pattern to be tried if both the quasi-Newton and Simplex methods fail to produce reasonable estimates;

(m) said minimization algorithm using Rosenbrock pattern search or method of rotating coordinates;

(n) said Rosenbrock pattern search involving rotating the parameter space and aligning one axis with ridge and all other axes remaining orthogonal to this axis;

(o) said detectable ridges pointing towards a minimum of function;

(p) said Rosenbrock pattern search method to be tried if other methods fail to provide a reasonable estimate; otherwise (q) said Rosenbrock pattern search method terminates early when there are several constraint boundaries that intersect, leading to a discontinuity in the ridges;

(r) said algorithms performed by each neuron of the hidden and output layers;

(s) said output neuron(s) performs a test of the appropriateness of the overall model using the plot of the observed versus predicted (target) values.

2. The method of claim 1 wherein the operation of the network is based on binary response in the form of a logit regression model;

wherein the predicted values for the dependent variable representing the weight value of the i th neuron will never be less than (or equal to 1 ), or greater than (or equal to 1), regardless of the values of the independent variables;

wherein the equation is given by:

$$y=\exp(b_0+b_1{}^*x_1+\ldots+b_n{}^*x_n)/[1+\exp(b_0+b_1{}^*x_1+\ldots+b_n{}^*x_n)];$$

wherein regardless of the regression coefficients and the magnitude of x values, this model will always produce predicted values (predicted y's) in the range of 0 to 1;

wherein the said logit model can be linearized via the logit or logistic transformation, and the probability p' given by:

$$p'=b_0+b_1{}^*x_1+\ldots+b_n x_n.$$

3. The method of claim 1 wherein the operation of said neural network is based upon responses that vary within a particular lower and upper limit using the general logistic regression model stated as:

$$y=b_0/[1+b_1{}^*\exp(b_2{}^*x)].$$

4. The method of claim 2 wherein said binary response has the form of probit regression model stated as:

$$NP=NP(b_0+b_1{}^*x_1+\ldots);$$

wherein NP stands for normal probability.

5. The method of claim 1 wherein the relationship between one or more independent input variables and a neuron weight as dependent variable changes over the range of the independent variables.

6. The method of claim 5 wherein the nature of the relationship applies a piecewise linear regression model stated as:

$$y=b_0+b_1{}^*x{}^*(x<=100)+b_2{}^*x{}^*(x>100);$$

wherein y stands for the estimated neuron weight and x for the input;

wherein the expression (x<=100) and (x<100) denote logical conditions that evaluate to 0 if false, and to 1 if true.

7. The method of claim 6 wherein the relationship applies the breakpoint regression model stated as:

$$y=(b_0+b_1{}^*x){}^*(x<=100)+(b_3+b_2{}^*x){}^*(x>100);$$

wherein the expression (x<=100) and (x>100) denote logical conditions that evaluate to 0 if false, and to 1 if true.

8. The method of claim 1 wherein the nature of the relationship applies an exponential regression model stated as:

$$y=b_0{}^*\exp(b_1{}^*x);$$

wherein y stands for the estimated neuron weight and x for the input; wherein $b_0$ and $b_1$ refer to measured parameters respectively.

9. The method of claim 1 wherein the weights are directly or inversely proportional to the neuron output.

10. The method of claim 1 wherein the weights have established relationship with the neuron output.

11. The method of claim 1 wherein the network has a reproduction phase when all the weights must be already known.

12. The method of claim 1 wherein the network has a learning phase when one applies input values to the network, reproduces the network, and compares the output values with given target values.

13. The method of claim 12 wherein according to the result of this comparison, one modifies the weights using devised learning rules.

14. The method of claim 1 wherein the said neural network is implemented using integrated circuit.

15. The method of claim 1 wherein said neural network is implemented using a computer program.

16. The method of claim 1 with wide range applications in electronics, industry, commerce, medicine etc.

17. A method of operating a neural network for ecological and biological system modeling having a plurality of hidden layer neurons said method comprising the following steps:

(a) distributing network inputs as driving independent variables;

(b) said independent variables comprising ecosystem parameters selected on the basis of biological or physical relationships;

(c) said independent variables providing input to first layer of hidden neurons;

(d) said neurons comprising processes within the elements of the ecological and biological systems;

(e) said ecological and biological systems comprising bacteria, zooplankton, phytoplankton and hydrogeological features;

(f) said processes within the ecological and biological systems comprising neuron weights;

(g) said neuron weights having established biological relationship with neuron output;

(h) said output of the first layer neurons being fed as input to the second layer of hidden neurons;

(i) said second layer neurons generating input either to plurality of other hidden neuron layers or to the output neuron layer;

(j) said output neuron layer generating the total output of the network.

18. The method of claim 17 applying a user-specified regression model to a plurality of neurons in the hidden and output neuron layers.

19. A method of operating a neural network for ecological and biological system modeling having a plurality of hidden layer neurons said method comprising: a plurality of network inputs and at least one network output, said plurality of neurons, each receiving a plurality of inputs applied to the network, reproduces the network using a current model, and compares the output values with given target values, said current regression model "hierarchially relates" such that the current model is identical to the previous model with the exception of an addition or deletion of one or more driving or independent variables to the previous model and using the comparison between the goodness of fit for the two models or difference to set the learning rules without need for repetitive training and yielding a global minimum for each given set of input variables.

20. The method of claim 19 wherein the state of the neural network is changing steadily in time;

wherein said network is simulated by a computer can alter its state only at discrete times t=0,1,2,3, . . . ;

wherein the time t=0 denotes the starting state of the network;

wherein given the state at the time t, the state at t+1 may be calculated.

* * * * *